United States Patent [19] [11] 4,250,964
Jewell et al. [45] Feb. 17, 1981

[54] PROCESS FOR RECOVERING CARBONACEOUS ORGANIC MATERIAL FROM A SUBTERRANEAN FORMATION

[75] Inventors: Douglas M. Jewell; William G. Moon, both of Pittsburgh, Pa.

[73] Assignee: Gulf Research & Development Company, Pittsburgh, Pa.

[21] Appl. No.: 94,756

[22] Filed: Nov. 15, 1979

Related U.S. Application Data

[63] Continuation-in-part of Ser. No. 927,865, Jul. 25, 1978, abandoned.

[52] U.S. Cl. .................................. 166/303; 166/272; 166/274; 166/305 R

[51] Int. Cl.³ ............................................. E21B 43/22

[58] Field of Search ............... 166/272, 273, 274, 303, 166/305 R

[56] References Cited

U.S. PATENT DOCUMENTS

| | | | |
|---|---|---|---|
| 2,595,979 | 5/1952 | Pevere et al. | 166/272 X |
| 2,857,002 | 10/1958 | Pevere et al. | 166/303 |
| 3,342,260 | 9/1967 | Lumpkin | 166/261 |
| 3,503,868 | 3/1970 | Shields | 166/303 X |
| 3,593,790 | 7/1971 | Herce | 166/303 X |
| 3,881,550 | 5/1975 | Barry | 166/272 |
| 3,948,320 | 4/1976 | Terry | 166/272 |
| 3,973,628 | 8/1976 | Colgate | 166/272 X |
| 3,990,513 | 11/1976 | Perch | 166/303 X |
| 4,050,515 | 9/1977 | Hamrick et al. | 166/303 |
| 4,127,170 | 11/1978 | Redford | 166/272 X |

*Primary Examiner*—James A. Leppink
*Assistant Examiner*—George A. Suchfield

[57] ABSTRACT

A process for recovering carbonaceous organic material from a subterranean formation containing carbonaceous organic material which comprises introducing into the formation a cyclohexene or cyclohexadiene, maintaining contact between the carbonaceous organic material and the cyclohexene or cyclohexadiene for a time and at a temperature sufficient to obtain carbonaceous organic material of reduced viscosity and then recovering carbonaceous organic material of reduced viscosity.

26 Claims, No Drawings

PROCESS FOR RECOVERING CARBONACEOUS ORGANIC MATERIAL FROM A SUBTERRANEAN FORMATION

This application is a continuation-in-part application of our U.S. patent application Ser. No. 927,865, filed July 25, 1978, now abandoned, for Process for Recovering Carbonaceous Organic Material From A Subterranean Formation.

BACKGROUND OF THE INVENTION

1. Field of the Invention

This invention relates to a process for recovering carbonaceous organic material from a subterranean formation containing said carbonaceous organic material which comprises introducing into said formation a cyclohexene or a cyclohexadiene, maintaining contact between said carbonaceous organic material and said cyclohexene or a cyclohexadiene for a time and at a temperature sufficient to obtain carbonaceous organic material of reduced viscosity and then recovering carbonaceous organic material of reduced viscosity.

2. Description of the Prior Art

It is well known that there exist throughout the world subterranean formations containing carbonaceous organic materials that are potentially recoverable by conventional insitu techniques. However, because of the lack of sufficient mobility of some of these carbonaceous organic materials, for example bitumen in tar sands, heavy, viscous crude oils, etc., at formation temperatures and pressures, conventional recovery techniques employed heretofor for substantially complete recovery of these carbonaceous materials have not been completely satisfactory, because they have not been economically and/or technically feasible. In some cases the recovery of carbonaceous materials that lack sufficient mobility in subterranean formation for feasible economic and/or technical recovery has necessitated the removal of the carbonaceous material and its associated inorganic materials from the subterranean formation to the surface for contact with solvent at elevated temperatures, as for example, U.S. Pat. Nos. 2,772,209 and 2,847,306 to Stewart et al.

SUMMARY OF THE INVENTION

We have discovered a process for recovering carbonaceous organic material from a subterranean formation containing said carbonaceous organic material which comprises introducing into said formation a cycloolefinic compound selected from the group consisting of a cyclohexene and a cyclohexadiene, maintaining contact between said carbonaceous organic material and said cycloolefinic compound for a time and at a temperature sufficient to obtain carbonaceous organic material of reduced viscosity and then recovering carbonaceous organic material of reduced viscosity.

Cyclohexenes that can be used in the process claimed herein can be defined by the following formula:

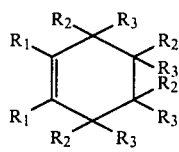

wherein $R_1$ and $R_2$, the same or different, can be hydrogen, an alkyl having from one to five carbon atoms, preferably one to two carbon atoms, a cycloalkyl having five carbon atoms, hydroxyl or a carbinol having from one to two carbon atoms, preferably one carbon atom; $R_3$ can be the same as $R_1$ and $R_2$, provided that at least one of said $R_3$ is hydrogen and the total number of carbon atoms in the molecule is in the range of six to eleven, preferably six to eight.

Cyclohexadienes that can be used in the process claimed herein can be defined by the following formulae:

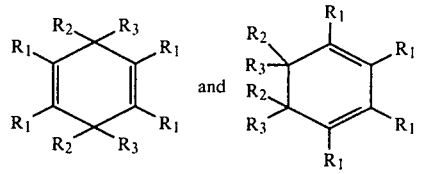

wherein $R_1$, $R_2$ and $R_3$ are as defined above and the total number of carbon atoms in the molecule is in the range of six to eleven, preferably six to eight.

Examples of cyclohexenes and cyclohexadienes that can be used herein include cyclohexene, 1-methylcyclohexene, 4-methylcyclohexene, 1,4-dimethylcyclohexene, 1-ethylcyclohexene, 1-propylcyclohexene, 1-n-pentylcyclohexene, 1-cyclopentylcyclohexene, 5-methyl-1-hydroxyl-2-cyclohexene, 1-carbinol-3-cyclohexene, 1,3-cyclohexadiene, 1,4-cyclohexadiene, 5-methyl-1,3-cyclohexadiene, etc. Cyclohexenes or the cyclohexadienes need not be used in their pure form but can be used in dilution with any stream containing any of the same, as, for example, coker naphtha stream containing from about five to about 20 weight percent of any of these compounds. Coker naphtha can be obtained, for example, by any of the conventional coking processes wherein the residual portion of any petroleum, bitumen, etc., boiling at a temperature above about 425° C. is subjected to a temperature above about 435° C. and a pressure of about 35 pounds per square inch gauge (0.2 MPa) to obtain coke, gas and a liquid product. From the latter there is obtained a product, referred to as coker naphtha, having a boiling range, at standard temperature and pressure, of about 40° to about 255° C.

In carrying out the process of this invention the first step involves injecting the cyclohexene(s) and/or cyclohexadiene(s), as defined above, into a well in communication with a subterranean formation containing the carbonaceous organic material sought to be recovered. In order to carry out the process defined herein the formation in contact with the cyclohexene(s) and/or cyclohexadiene(s) must be at a temperature in the range of about 100° to about 450° C., or even higher, preferably about 135° to about 325° C., a pressure in the range of about 50 to about 4,000 pounds per square inch gauge (about 0.3 to about 27.5 MPa), preferably about 200 to about 2000 pounds per square inch gauge (about 1.3 to about 13.8 MPa) and for a period of about 0.5 hour to about 30 days or even higher, but preferably for about 24 hours to about seven days.

At the end of the operating period recovery of liquid product can be effected using any conventional procedure. Thus, for example, injection of the cyclohexenes or cyclohexadienes into the formation is terminated and liquid product is removed through the same injection well by standard depressurization and pumping techniques. Alternatively, the liquid product can be removed from one or more producing wells removed from, but in communication with, the injection well. Because the cyclohexenes or cyclohexadienes employed herein possess relatively low boiling points, and consequently relatively high vapor pressures, these materials possess high miscibility with the carbonaceous organic material and associated water, thereby increasing total formation pressure and enhancing fluid movement in the formation.

The products issuing from the formation of an emulsion will contain primarily water, gas and organic components. These components can be separated from each other by any conventional techniques, for example, stripping, settling and distillation. Because of the presence of the cyclohexenes or the cyclohexadienes in the emulsion, we have observed that the breaking and separation of the emulsion is more readily achieved than if cyclohexenes or cyclohexadienes were not present.

If the formation temperature naturally does not fall within the temperature range defined above, the temperature of the formation can be raised to the desired level by any suitable means, for example, by steam or combustion techniques.

In cases wherein steam is injected into the formation for the purpose of heating the carbonaceous organic material to the desired level and/or to provide a driving force to increase the mobility of carbonaceous organic material, it can be introduced into the formation prior to injection of the cyclohexenes or the cyclohexadienes into the formation, in conjunction with the cyclohexenes or the cyclohexadienes or after injection of cyclohexenes or the cyclohexadienes. In addition any cyclic arrangement of the above injections can be used. The relative amounts of steam and cyclohexenes or the cyclohexadienes used in the above can be infinitely varied to obtain the desired objectives. Under the conditions of operation defined hereinabove, the steam and the cyclohexenes or the cyclohexadienes are substantially miscible in each other.

As a result of treating the carbonaceous organic material in the subterranean formation with the cyclohexenes or the cyclohexadienes, as defined above, a carbonaceous organic material of reduced viscosity is obtained. In addition we have found that the weight percents of asphaltenes and of sulfur in the recovered carbonaceous organic material are lower than the weight percents of asphaltenes and of sulfur of the untreated carbonaceous organic material. While we are not sure as to the mechanism occurring in the defined treatment of the carbonaceous organic material with cyclohexenes or cyclohexadienes, we can postualte that perhaps hydrogen transfer may occur between the carbonaceous organic material and the cyclohexenes or cyclohexadienes, possibly resulting in depolymerization and desulfurization of the carbonaceous organic material and reducing the asphaltene content thereof; reaction may occur between the cyclohexenes or the cyclohexadienes and the carbonaceous organic material, resulting in a carbonaceous organic material of reduced viscosity. Some other mechanism may be primarily responsible for the reduction in viscosity of the carbonaceous organic material; or some combination of two or more of the above may occur. In any event the removal of carbonaceous organic material from a subterranean formation is facilitated by following the dictates of the process claimed herein and a product carbonaceous organic material is recovered having enhanced properties as to viscosity and to the relative amounts of asphaltenes and sulfur present.

DESCRIPTION OF PREFERRED EMBODIMENTS

EXAMPLE I

An insulated steel cell having a length of 10 inches (25.4 centimeters) and a diameter of one inch (2.5 centimeters) was packed with core samples of rich tar sands containing from about 10 to about 16 weight percent of bitumen from the Cold Lake or Wabasca fields in Alberta, Canada. The raw tar sands were packed into the steel cell to simulate the porosity of the in-situ deposits. In each of the two cells used the porosity was about 50 percent and the pore volume about 80 cubic centimeters. Either cyclohexene or coker naphtha was passed upwardly through the externally-heated insulated steel cells using a flow rate of 645 milliliters per hour and at selected temperatures, pressures and flow rates to simulate the movement of fluid through a formation. Upon completion of the runs, the resulting bitumen product was recovered and analyzed. In each case all of the bitumen was recovered from the core samples. The results obtained are set forth in Table I.

TABLE I

| Run No. | Core Source | Cyclohexene or Coker Naphtha | Cell Temperature, °C. | Cell Pressure, Pounds Per Square Inch Gauge (MPa) | Duration of Run, Hours | Weight Percent Sulfur | Weight Percent Asphaltenes* | Viscosity cps at 93° C.** |
|---|---|---|---|---|---|---|---|---|
| 1 | Cold Lake | Cyclohexene | 25 | 14.7 (0.1) | 1.0 | 4.5 | 23 | 125 |
| 2 | Wabasca | Cyclohexene | 25 | 14.7 (0.1) | 1.0 | 5.5 | 17 | 955 |
| 3 | Cold Lake | Coker Naphtha | 135 | 14.7 (0.1) | 1.0 | 4.4 | 18 | 125 |
| 4 | Cold Lake | Coker Naphtha | 150 | 600 (4.1) | 24 | 3.5 | 5.2 | NT*** |
| 5 | Cold Lake | Coker Naphtha | 150 | 600 (4.1) | 100 | 3.5 | 5.2 | 110 |
| 6 | Cold Lake | Coker Naphtha | 150 | 1100 (7.6) | 24 | 3.4 | 4.4 | NT*** |
| 7 | Cold Lake | Coker Naphtha | 150 | 1100 (7.6) | 100 | 3.4 | 4.4 | 101 |
| 8 | Cold Lake | Coker Naphtha | 200 | 600 (4.1) | 24 | 3.4 | 4.6 | NT*** |
| 9 | Cold Lake | Coker Naphtha | 250 | 600 (4.1) | 100 | 3.3 | 4.6 | 82 |
| 10 | Cold Lake | Coker Naphtha | 300 | 600 (4.1) | 100 | 3.0 | 4.0 | 37 |

TABLE I-continued

| Run No. | Core Source | Cyclohexene or Coker Naphtha | Cell Temperature, °C. | Cell Pressure, Pounds Per Square Inch Gauge (MPa) | Duration of Run, Hours | Weight Percent Sulfur | Weight Percent Asphaltenes* | Viscosity cps at 93° C.** |
|---|---|---|---|---|---|---|---|---|
| 11 | Cold Lake | Coker Naphtha | 300 | 1100 (7.6) | 100 | 2.6 | 3.0 | 9 |
| 12 | Wabasca | Coker Naphtha | 250 | 400 (2.7) | 90 | 3.3 | 3.0 | 50 |
| 13 | Wabasca | Cyclohexene | 250 | 410 (2.8) | 90 | 3.4 | 4.0 | 50 |
| 14 | Wabasca | Cyclohexene | 250 | 410 (2.8) | 4 | 5.5 | 12.0 | NT*** |

*n-pentane insolubles
**Viscosity determined on an LVT Brookfield Viscometer using a shear rate of 15.8 inverse seconds.
***Not taken Runs Nos. 1 and 2 were similarly carried out using benzene, toluene, tetrahydrofuran and chloroform. The product analysis was found to be the same in each instance. Accordingly, the product in Runs Nos. 1 and 2 is identical to the in-place bitumen in the tar sands.

The coker naphtha employed in the above runs was obtained as a result of a delayed coking operation from the Gulf Oil Corporation, Port Arthur, Tex., refinery and was analyzed as follows:

TABLE II

| Boiling Range (ASTM D-86): | 40°-250° ($C_5$-$C_{11}$) |
|---|---|
| F1A Analysis (ASTM D-1319) and Mass Spectrometry: | 52 Weight Percent Saturates |
| | 12 Weight Percent Aromatics |
| | 12 Weight Percent Cyclic Olefins (Cyclohexenes and Cyclohexadienes) |
| | 24 Weight Percent Aliphatic Olefins |

The data in Table II clearly illustrate the advantages of operation in accordance with the process defined and claimed herein. Although in Run No. 3 there was a reasonable drop in asphaltene content in the product, the contact was not of sufficient duration to effect any noticeable reduction in viscosity of the bitumen. We believe that had longer contact time been in effect in Run No. 3 a noticeable reduction in viscosity would have taken place. Increasing the temperature, pressure and contact in Run No. 4 resulted in a product having a lower sulfur content and a significantly lower asphaltene content. Simply increasing contact time in Run No. 5 produced no further decrease in sulfur and asphaltene content. However, note that the viscosity of the bitumen product was significantly lower than the in-place bitumen. It is believed that the drop in weight percent asphaltenes in the treated product is a result of the reaction between the bitumen and the cyclic olefins, resulting in a product of reduced viscosity. Had viscosity measurement been made of the product in Run No. 4, it would therefore have been expected that its viscosity would have been about the same as those of Run No. 5. Runs Nos. 6 to 12 additionally show the effect in varying the temperature, pressure and contact time in the process claimed herein. Best results appear to be obtained at elevated temperatures and pressures, as evidenced by Run No. 11 wherein the sulfur, asphaltenes and viscosity all reach a minimum. A comparison of Runs Nos. 13 and 14 with Run No. 12 clearly illustrate that pure cyclohexenes or cyclohexadienes are not needed, since the results obtained in each case are essentially the same.

EXAMPLE II

An insulated steel cell having a length of 48 inches (122 centimeters) and a diameter of 1½ inches (3.8 centimeters) was packed with core samples from the same Cold Lake field as in Example I. The pore volume and porosity were essentially the same. In Run No. 1, 400 milliliters per hour of steam at a temperature of 300° C. and a pressure of 600 pounds per square inch gauge (2.0 MPa) was passed upwardly through the cell (thereby maintaining the temperature of the cell at 300° C. and the pressure at 600 pounds per square inch gauge (4.1 MPa)) over a period of five hours, at the end of which time no further bitumen appeared to be present in the product line. Run No. 2 was similar to Run No. 1, except that the steam was at a pressure of 1100 pounds per square inch gauge (7.6 MPa). Run No. 3 was similar to Run No. 1 except that after adding steam to the cell for five hours 40 milliliters per hour of the same coker naphtha used in Example I was commingled with the steam. This was continued for two hours. At the end of this period no further bitumen appeared in the product. Run No. 4 was similar to Run No. 3 except that the steam was at a pressure of 1100 pounds per square inch gauge (7.6 MPa). In Run No. 5 steam was injected into the cell for a period of five hours as in Run No. 1, at which time steam flow was stopped, and coker naphtha was injected into the cell at a rate of 400 milliliters per hour for 30 minutes. Coker naphtha flow was then stopped and steam was again injected as at the beginning for one hour. No further bitumen appeared in the product. Run No. 6 was a repeat of Run No. 5 but at 1100 pounds per square inch gauge (7.6 MPa). Run No. 7 was a repeat of Run No. 5 except that after the last steam injection a second slug of coker naphtha alone was injected at 400 milliliters per hour for 30 minutes, followed by an additional slug of steam alone as previously used for 30 minutes. No further bitumen appeared in the product. Run No. 8 was the same as Run No. 7 except that the pressure was maintained at 1100 pounds per square inch gauge (7.6 MPa). The resulting bitumen product obtained in each of these runs was analyzed. The data are set forth below in Table III.

TABLE III

| Run No. | Weight Percent Bitumen Removed from Cell | Weight Percent Asphaltenes | Weight Percent Sulfur |
|---|---|---|---|
| 1 | 39 | 23 | 4.4 |
| 2 | 46 | 23 | 4.4 |
| 3 | 99 | 3.1 | 3.0 |
| 4 | 99 | 3.1 | 3.0 |
| 5 | 77 | 4.0 | 3.5 |
| 6 | 83 | 4.0 | 3.5 |
| 7 | 91 | 4.0 | 3.5 |

TABLE III-continued

| Run No. | Weight Percent Bitumen Removed from Cell | Weight Percent Asphaltenes | Weight Percent Sulfur |
|---|---|---|---|
| 8 | 97 | 4.0 | 3.5 |

Material balances were made for Runs Nos. 7 and 8 in Table III. The results are set forth below in Table IV.

TABLE IV

| | Run No. 7 | |
|---|---|---|
| | Introduced Into System | Recovered |
| Water, cc. | 2493 | 2384 |
| Coker Naphtha, cc | 576 | 575 |
| Bitumen In Core, gm. | 65.5 | 60.0 |
| Composition of Bitumen | 18 Wt. % Asphaltenes | 4.4 Wt. % Asphaltenes |
| | 4.4 Wt. % Sulfur | 3.5 Wt. % Sulfur |
| | 210 Cps Viscosity At 200° F. (93.3° C.) | 74 Cps Viscosity At 200° F. (93.3° C.) |
| | Run No. 8 | |
| | Introduced Into System | Recovered |
| Water, cc. | 2490 | 2490 |
| Coker Naphtha, cc. | 391 | 391 |
| Bitumen In Core, gm. | 68.8 | 68.0 |
| Composition of Bitumen | 18 Wt. % Asphaltenes | 4.0 Wt. % Asphaltenes |
| | 4.4 Wt. % Sulfur | 3.5 Wt. % Sulfur |
| | 210 Cps Viscosity At 200° F. (93.3° C.) | 66 Cps Viscosity At 200° F. (93.3° C.) |

In each of Runs Nos. 7 and 8 above, all of the water, coker naphtha and bitumen in the system were accounted for; the slight amounts of water and bitumen that were not recovered were found to be in the core samples.

The data in Tables I and III show that whether or not cyclohexene is injected alone, coinjected with steam or cyclic injection of cyclohexene and steam are used, the same desired reductions in asphaltene and sulfur in the bitumen product are obtained. In addition, it can be seen that operation in accordance with the process claimed herein results in significantly increased bitumen recovery.

Obviously, many modifications and variations of the invention, as hereinabove set forth, can be made without departing from the spirit and scope thereof, and therefore only such limitations should be imposed as are indicated in the appended claims.

We claim:

1. A process for recovering carbonaceous organic material selected from the group consisting of bitumen and heavy, viscous crude oil from a subterranean formation containing said carbonaceous organic material which comprises introducing into said formation a cycloolefinic compound selected from the following groups of compounds.

(A) cyclohexenes of the following formula:

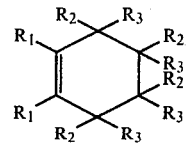

wherein $R_1$ and $R_2$, the same or different, can be hydrogen, an alkyl having from one to five carbon atoms, a cycloalkyl having five carbon atoms, hydroxyl or a carbinol having from one to two carbon atoms, $R_3$ being the same as $R_1$ and $R_2$, provided at least one of said $R_3$ is hydrogen and that the total number of carbons in the molecule is in the range of six to eleven; and (B) cyclohexadienes of the following formulae:

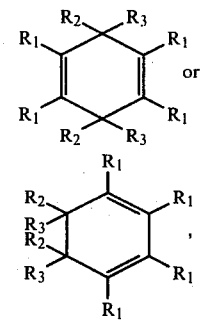

wherein $R_1$, $R_2$ and $R_3$ are as defined above and the total number of carbon atoms in the molecule is in the range of six to eleven, maintaining contact between said carbonaceous organic material and said cyclohexene or cyclohexadiene for a time and at a temperature sufficient to obtain carbonaceous organic material of reduced viscosity and then recovering carbonaceous organic material of reduced viscosity.

2. The process of claim 1 wherein said temperature is in the range of about 100° to about 450° C.

3. The process of claim 1 wherein said temperature is in the range of about 135° to about 325° C.

4. The process of claim 1 wherein the pressure during said contact time is in the range of about 50 to about 4000 pounds per square inch gauge.

5. The process of claim 1 wherein the pressure during said contact time is in the range of about 200 to about 2000 pounds per square inch gauge.

6. The process of claim 1 wherein said contact time is in the range of about 0.5 hour to about 30 days.

7. The process of claim 1 wherein said contact time is in the range of about 24 hours to about seven days.

8. The process of claim 1 wherein said temperature is in the range of about 100° to about 450° C., the pressure during contact is in the range of about 50 to about 4000 pounds per square inch gauge and the contact time is in the range of about 0.5 hour to about 30 days.

9. The process of claim 8 wherein steam is also introduced into said formation.

10. The process of claim 1 wherein said temperature is in the range of about 135° to about 325° C., the pressure during contact is in the range of about 200 to about 2000 pounds per square inch gauge and the contact time is in the range of about 24 hours to about seven days.

11. The process of claim 10 wherein steam is also introduced into said formation.

12. The process of claim 1 wherein said carbonaceous organic material is bitumen.

13. The process of claim 1 wherein said carbonaceous organic material is a heavy, viscous crude oil.

14. The process of claim 1 wherein the alkyl has from one to two carbon atoms, and the carbinol has one carbon atom and the total number of carbon atoms in the molecule is in the range of six to eight.

15. The process of claim 1 wherein said cycloolefinic compound is a cyclohexene of the following formula:

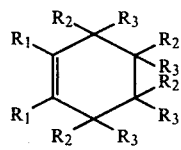

wherein $R_1$ and $R_2$, the same or different, can be hydrogen, an alkyl having from one to five carbon atoms, a cycloalkyl having five carbon atoms, hydroxyl or a carbinol having from one to two carbon atoms, $R_3$ being the same as $R_1$ and $R_2$, provided at least one of said $R_3$ is hydrogen and that the total number of carbon in the molecule is in the range of six to eleven.

16. The process of claim 15 wherein the alkyl has from one to two carbon atoms, and the carbinol has one carbon atom and the total number of carbon atoms in the molecule is in the range of six to eight.

17. The process of claim 15 wherein steam is also introduced into said formation.

18. The process of claim 1 wherein the cycloolefinic compound is a cyclohexadiene of the following formulae:

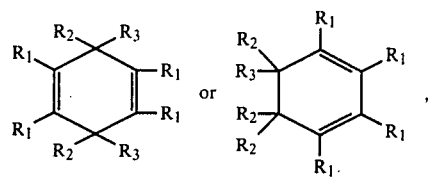

wherein $R_1$ and $R_2$, the same or different, can be hydrogen, an alkyl having from one to five carbon atoms, a cycloalkyl having five carbon atoms, hydroxyl or a carbinol having from one to two carbon atoms, $R_3$ being the same as $R_1$ and $R_2$, provided at least one of said $R_3$ is hydrogen and that the total number of carbon in the molecule is in the range of six to eleven.

19. The process of claim 18 wherein the alkyl has from one to two carbon atoms, and the carbinol has one carbon atom and the total number of carbon atoms in the molecule is in the range of six to eight.

20. The process of claim 1 wherein the cocylolefinic compound is cyclohexene.

21. The process of claim 20 wherein steam is also introduced into said formation.

22. The process of claim 1 wherein steam is also introduced into said formation.

23. The process of claim 1 wherein steam is introduced into said formation prior to injection thereof of said cycloolefinic compound.

24. The process of claim 1 wherein steam is introduced into said formation in conjunction with said cycloolefinic compound.

25. The process of claim 1 wherein steam is injected into said formation after injection of said cycloolefinic compound.

26. The process of claim 1 wherein steam and said cycloolefinic compound are injected into said formation in a cyclic arrangement.

* * * * *